US008428644B1

(12) United States Patent
Harooni

(10) Patent No.: US 8,428,644 B1
(45) Date of Patent: Apr. 23, 2013

(54) INTEGRATED LIGHTING ACCESSORY AND CASE FOR A MOBILE PHONE DEVICE

(76) Inventor: Hooshmand Harooni, Los Angeles, CA (US)

( * ) Notice: Subject to any disclaimer, the term of this patent is extended or adjusted under 35 U.S.C. 154(b) by 0 days.

(21) Appl. No.: 13/355,439

(22) Filed: Jan. 20, 2012

(51) Int. Cl.
*H04M 1/00* (2006.01)
*G02B 6/00* (2006.01)

(52) U.S. Cl.
USPC ........................................ 455/550.1; 362/551

(58) Field of Classification Search ............... 455/575.8, 455/550.1, 566, 575.7, 404.1, 567; 362/551, 362/602, 297, 296.01; 396/199, 178, 535
See application file for complete search history.

(56) References Cited

U.S. PATENT DOCUMENTS

| 7,127,163 | B2 * | 10/2006 | Lee et al. ....................... 396/198 |
| 7,422,353 | B2 * | 9/2008 | Tenmyo ........................ 362/551 |
| 2004/0253976 | A1 * | 12/2004 | Lin ............................. 455/550.1 |
| 2005/0253923 | A1 * | 11/2005 | Komori et al. ............. 348/14.02 |

* cited by examiner

*Primary Examiner* — Kiet Doan

(57) ABSTRACT

This invention describes a protective mobile phone device case that provides a LED lighting solution integrated with the case. The LED lighting solution can be utilized with the functions of the mobile phone device to provide additional illumination for photography and videography purposes as well as to provide ornamental or decorative enhancements to the device.

2 Claims, 7 Drawing Sheets

INTEGRATED LIGHTING ACCESSORY AND CASE FOR A MOBILE PHONE DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

SUMMARY OF THE INVENTION

In view of the foregoing, the Integrated Lighting Accessory and Case for a Mobile Phone Device described in this application provides for a portable LED lighting solution integrated with a protective phone case to provide for illumination for a variety of different purposes as described below.
  a. Photography and Videography Purposes: Some mobile phone devices provide for LED lights built into the phone device itself. The issue with many of these designs is that the illumination provided is not diffused sufficiently or not dispersed enough to be an appropriate lighting source for professional photography/videography purposes. Each individual LED light source in this invention is covered by a frosted or softening lens, and this combined with the quantity of lights in the LED light ring a significantly enhanced light source that is appropriate for this purpose.
  b. Ornamental or Decorative Purposes: Each LED light in the LED light ring can be individually turned on or off, or lit in sequence. The LED light ring can be provided in either a standard white light configuration or a tri-color configuration. In these different embodiments, the Integrated Lighting Accessory and Case for a Mobile Phone Device invention can light up the LEDs for a variety of different applications. Some examples could be to light alternating LED lights in sequence or to light each LED light in the ring one at a time in rotating fashion to provide for different illuminating patterns either when desired by a user or associated with incoming calls on the phone device. Alternatively, in the configuration where tri-color LEDs are used, different color illuminations could be utilized to present different callers, or different types of incoming callers on the phone device.
This invention provides for a protective case comprised of two parts, a base part and a cover part. The base part is designed to allow the mobile phone device to slide into the base part that allows the docking port on the mobile phone device to attach to a receptacle on the base part that lines up with docking port on the phone device. The cover part then is designed to slide over the phone device, and attach to the base part using a series of lock tabs, thereby securing the phone tightly in place.

The base part has integrated within it a portable power source (battery) that is used to provide power to the LED light ring. It can also be used to provide backup power to the mobile phone device itself. The base part also houses and exposes a docking port that is accessible from the exterior of the protective case. This docking port could be in a form identical to the docking port that is native to the mobile phone device, thereby allowing the base part to provide a "pass through" exterior connection. Alternatively, the base part could provide a different type of exterior connection such as a standard USB or mini-USB type port, and that port could be utilized to interface with both the mobile phone device and the LED light ring controls embedded within the protective case. The diagrams in this application depict a configuration where the exterior of the base part exposes a mini-USB type port, but this is not required.

In some embodiments, the mobile phone device's speakers may be situated on the device such that may become partially or fully obscured as a result of attaching it this invention. In this case, the Integrated. Lighting Accessory and Case for a Mobile Phone Device provides for an ability to expose and enhance the device's speakers by providing an external opening through the protective case. In the embodiment shown in the diagrams, the bottom of the base unit provides for "speaker horns" that will amplify the sound from the device's speakers when the protective case from this invention is attached.

The base unit also contains a thin circuit board attached to the LED light ring, power source (battery), and a connection to both the external mini-port (if present) and to the docking port on the mobile phone device itself. This circuitry contains the processing power necessary to provide the control mechanism to address and control the illumination of each and every LED light contained within the LED light ring in the case.

The Integrated Lighting Accessory and Case for a Mobile Phone Device invention also will provide for an associated software application running on the mobile device that will allow third parties to control the LED lights on the ring. This application will be available as (a) an end user software application with an appropriate user interface that will allow users to create and associate differing light patterns with varying events on the mobile phone device, and (b) a software developer's toolkit that will allow third party software developers to write their own software applications that will allow them to, using the software toolkit, to control individual LED lights in the light ring in whatever manner they desire.

Finally, it should be noted that in the configuration of this invention that houses a mini-USB or standard USB connector in the base part, a cable will be provided that is appropriate for the model and manufacturer of the mobile phone device to which the protective case is targeted that will allow the end use to charge and sync the phone device in an identical manner as if the protective case were not present.

DETAILED DESCRIPTION OF THE INVENTION

Figure 1:
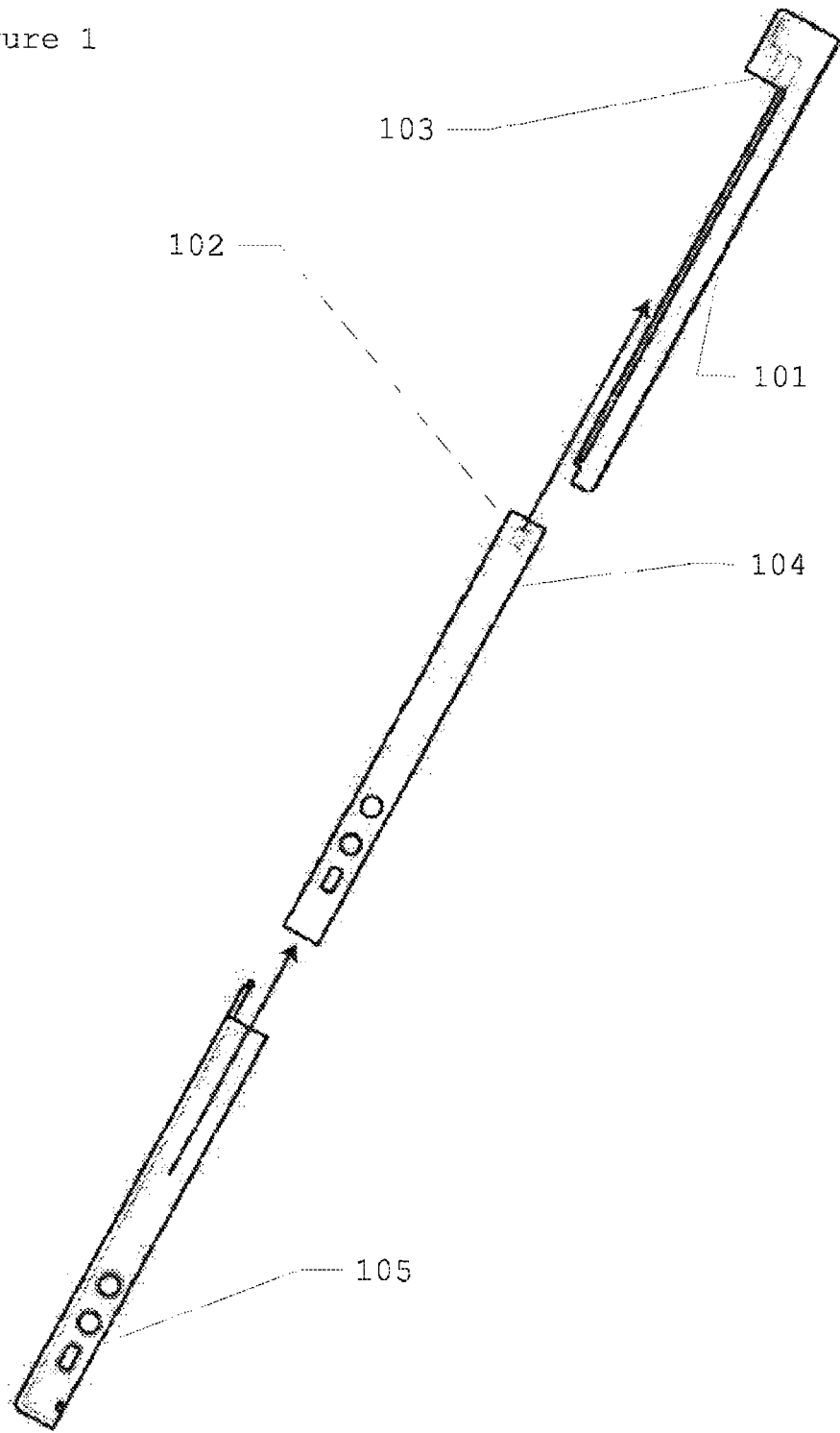
FIG. 1 A diagram showing the assembly of the protective case of this invention with the base part, mobile phone device, and cover part.

<FIG. 1> in the attached diagrams shows the basic mechanism used to assemble the integrated Lighting Accessory and case for a Mobile Phone Device invention. 101 shows the base part of the protective case, and 104 shows the mobile phone device. As can been by following the arrow coming from 104, as the mobile phone device is slid into the base part the docking port of the mobile phone at 102 attaches securely to the docking assembly 103 in the base part. Once the mobile phone device is attached to the base part, the cover part 105 is slid over the mobile phone device to complete the protective case assembly.

Figure 2:
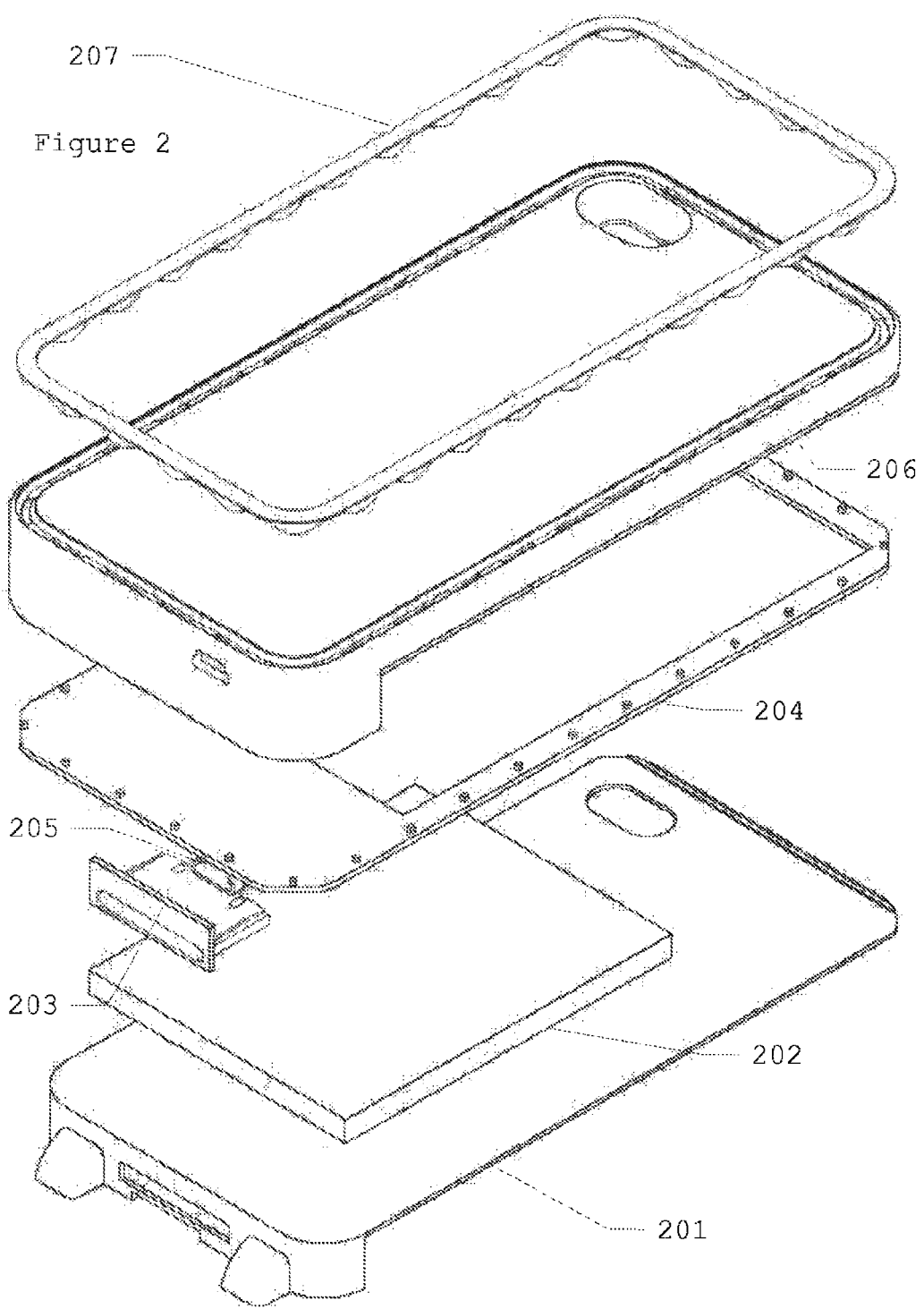
FIG. 2 A isometric cutaway view showing all of the different layers of the base and the LED ring assembly.

In <FIG. 2>, a detailed isometric cutaway view is shown with all of the layers of the base part exposed in detail. 201 shows the outside most layer of the base part with 202 showing the portable power source or battery that sits in the exterior housing 201. 204 shows the circuit board layer housing the actual LED light bulbs, with the optional mini-USB port depicted in 205, and the docking attachment 203 that attaches to the docking port of the mobile phone device. 206 forms another exterior portion of the protective case that slips over 201, and the assembly is complete with the LED light ring lenses shown in 207.

Figure 3:
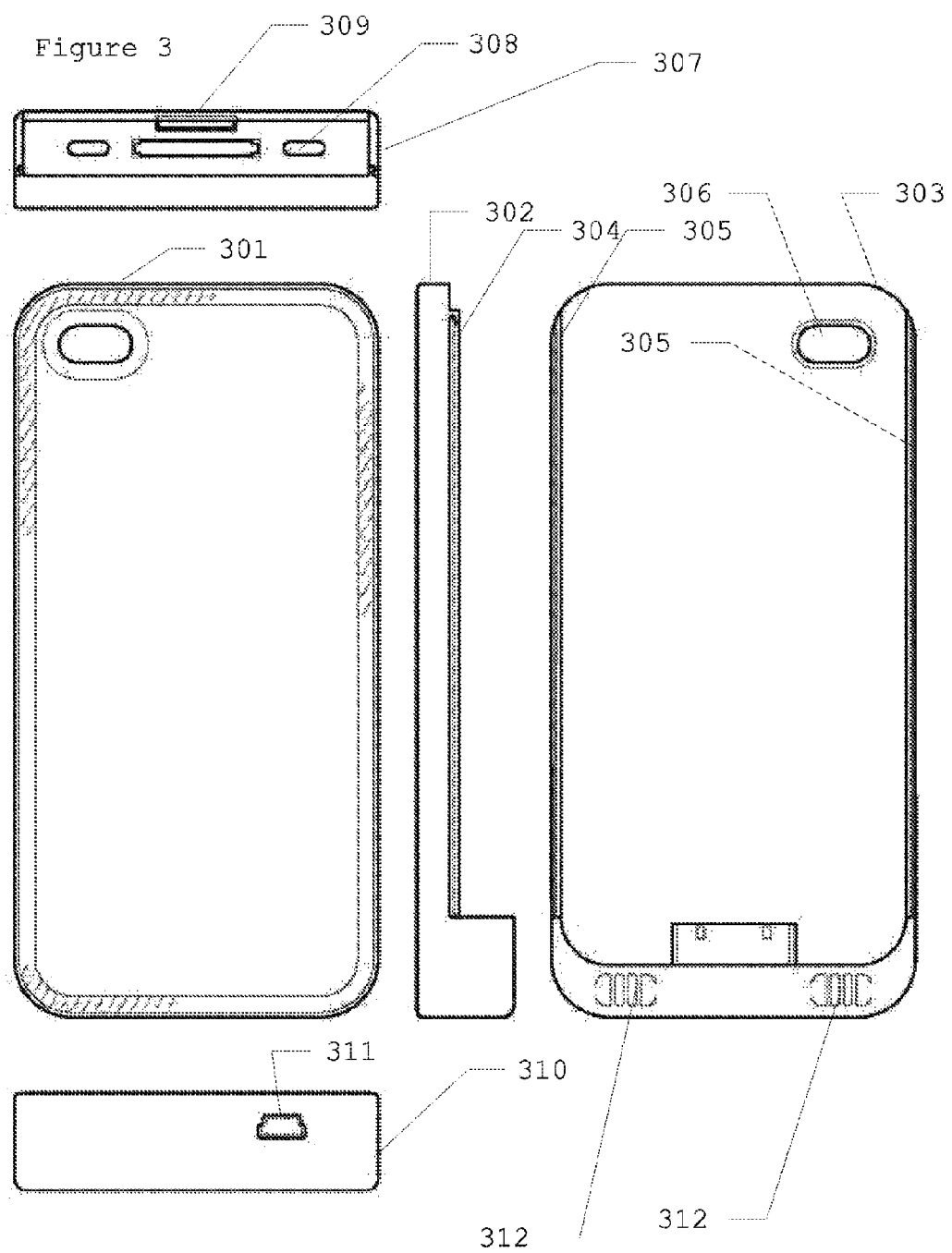
FIG. 3 A diagram depicting various views of the base unit without the phone device attached.

<FIG. 3> shows the base unit with the interior portion exposed. 301 is a view of the base unit from the exterior, clearly depicting an opening corresponding to the location of a camera that is part of the mobile phone device. 302 shows a side view of the base part, with 304 showing a slot into which the mobile phone device is guided in order to be place into the base part. 303 shows the interior view of the base part, and again, 305 shows the slots into which the phone device is guided into to be placed into the base part. The opening to expose the camera portion of the mobile phone device is shown in 306. At the bottom of the interior view, 312 shows the grills covering the speaker horn that allow the sound from the mobile phone device to be amplified. Finally, 310 shows an exterior view of the bottom of the base unit, with 311 depicting the optional mini-USE port.

Figure 4:
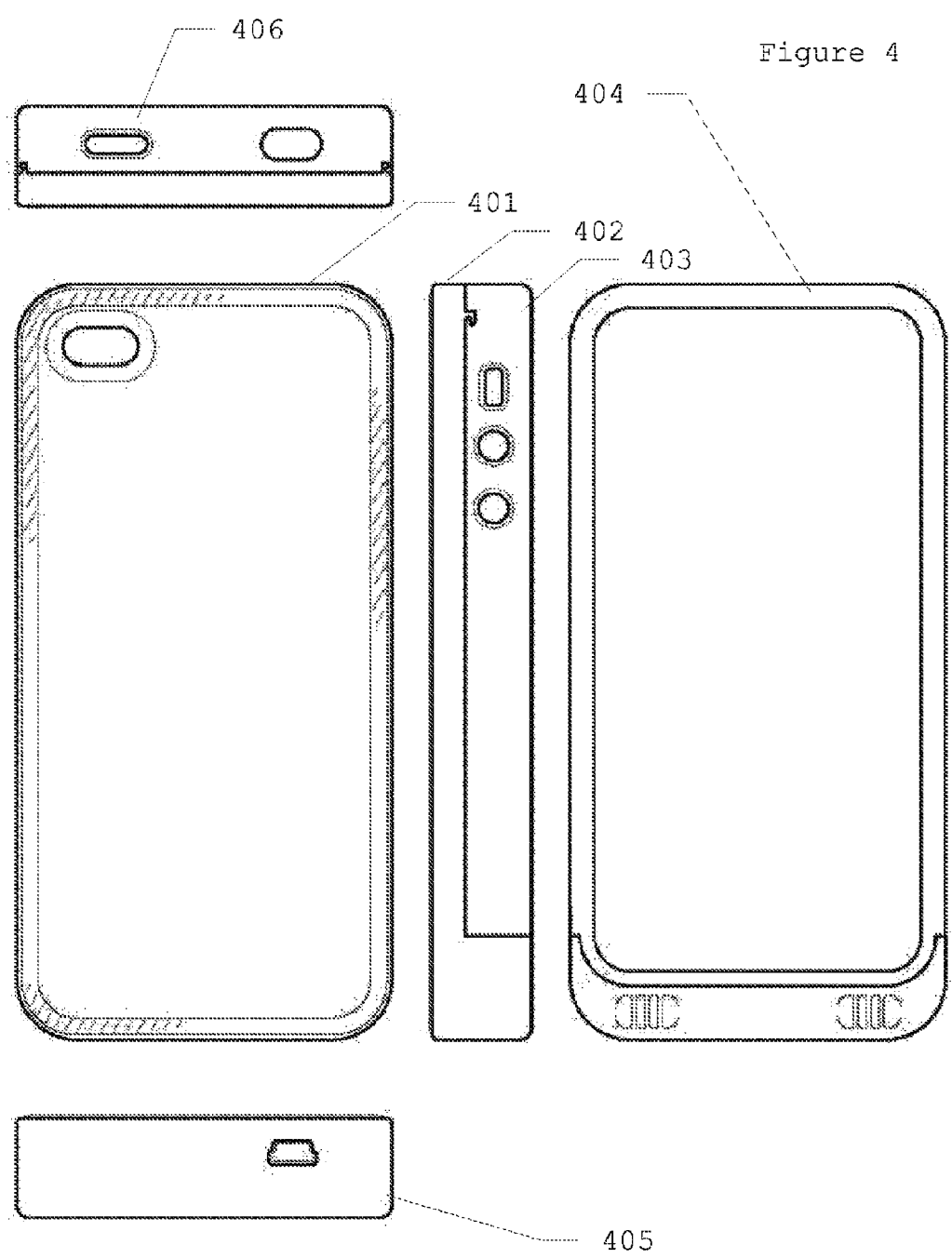
FIG. 4 Identical to FIG. 3 but with phone device attached.

<FIG. 4> shows the same views as <FIG. 3> but with the mobile phone device attached. 401 is an exterior view, 402 shows a side view with the mobile phone device 403 attached. 404 depicts the interior view, 405 shows the exterior bottom view, and 406 shows a view from the open top portion of the base part with the mobile phone device attached.

Figure 5:
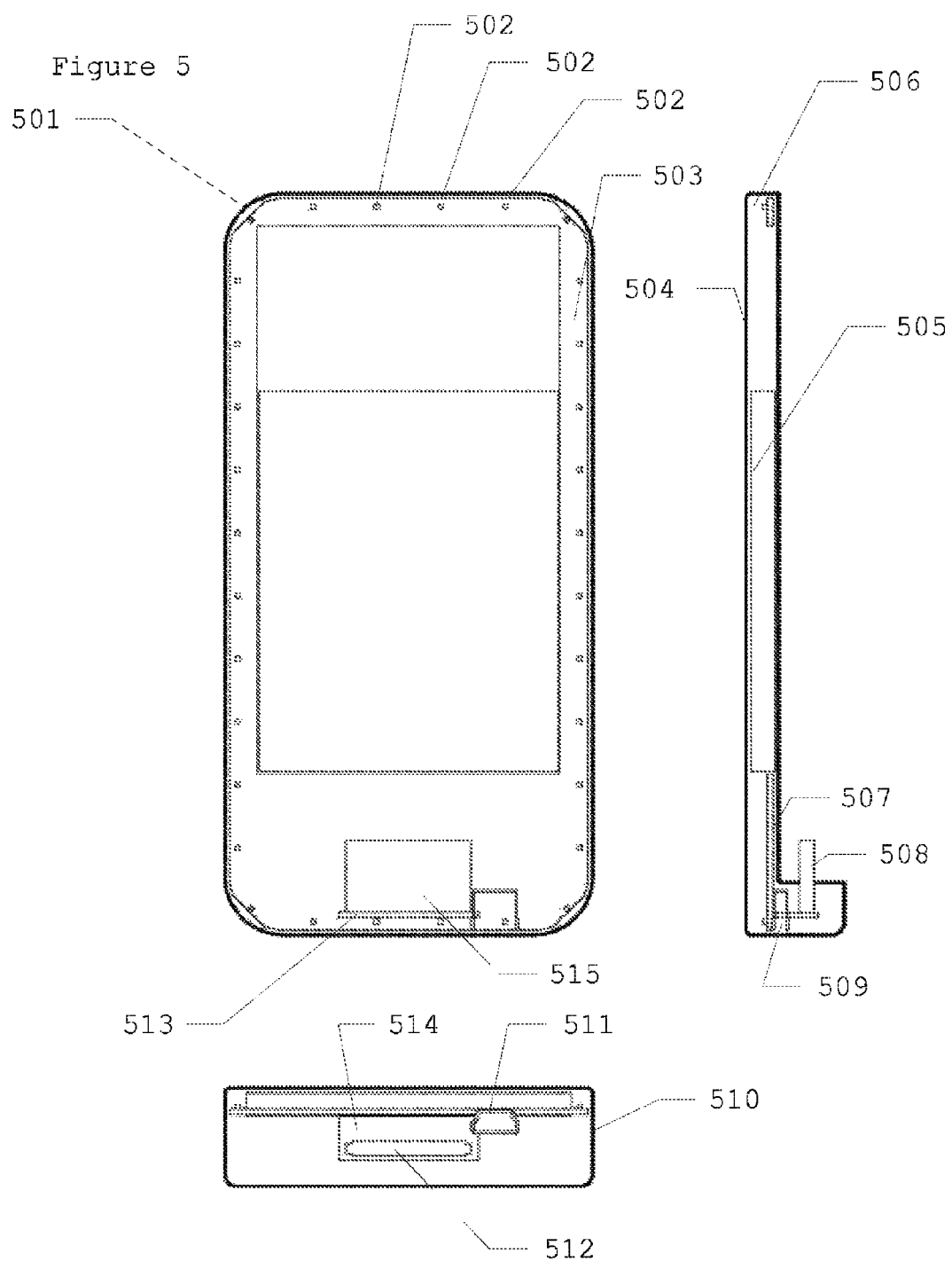
FIG. 5 Details of the circuit board housing the LED light ring.

In <FIG. 5> a detailed view of the LED light ring layer is shown. The circuit board onto which the individual lights are mounted is shown in 501. 502 shows the locations of the individual, evenly spaced on the circuit board as shown, with 503 showing the portion of the circuit board onto which the electronics is mounted. At the bottom of the circuit board view, the dock connector 515, is shown attached to the dock connector circuit board, 513. A side view of the base part in shown in 504, with the portable power source (battery) 505. 506 shows a detailed view of an individual LED light bulb, with a corresponding side view of the LED circuit board shown in 507. In 508 and 509 can be seen side views of the docking assembly and the optional mini-USE port, respectively. Finally, 510 shows a view looking down into the interior of the base part. This view shows the dock connector 512 attached to the dock connector circuit board 514, and the optional USB mini-port shown in 511.

Figure 6:
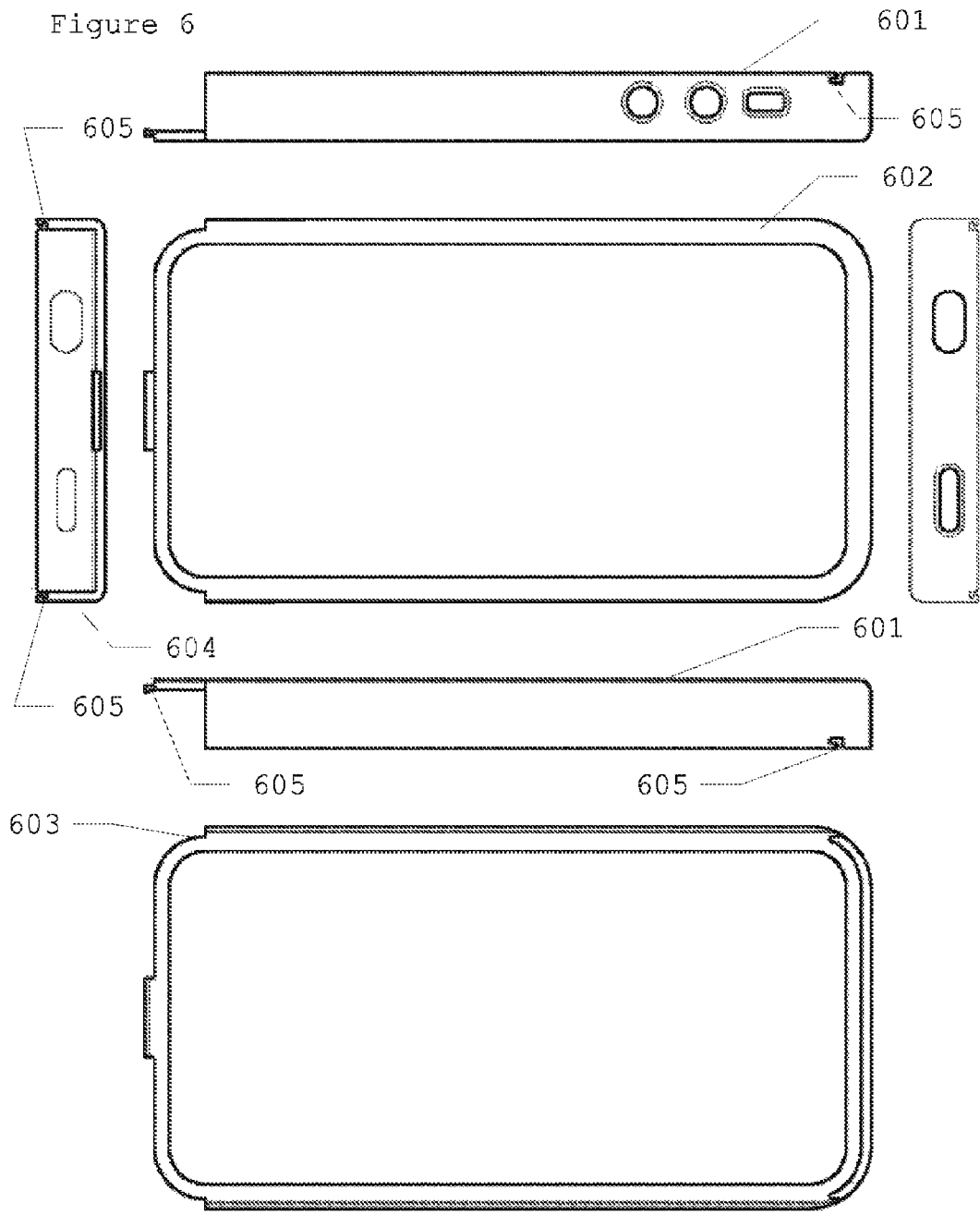
FIG. 6 Different views of the cover part.

The cover part is shown in more detail in <FIG. 6>. Sections 601 show the left side and right side views of the cover part. In each of the side views 605 shows the multiple locking tabs that are used to snap the cover part to the base part to complete protective case assembly. 602 and 603 show the exterior and interior view of the cover part, respectively, and in these diagrams clearly be seen the opening in the cover part to allow access to the touch screen portion of the mobile phone device. 604 shows the interior of the top portion of the cover part, and again, clearly in 605 can be seen the locking tabs that hold the cover part securely in place to the base part.

Figure 7:
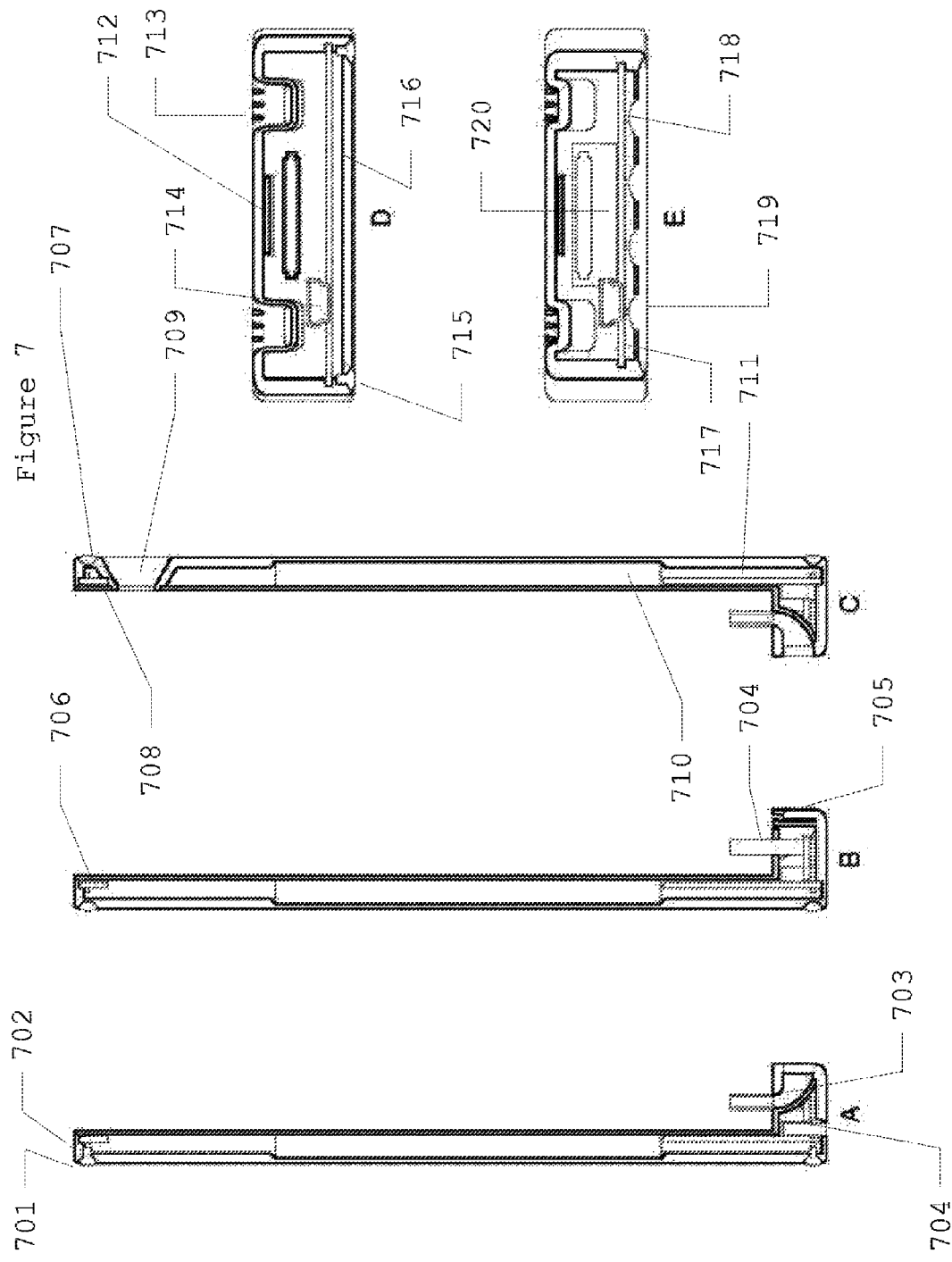
FIG. 7 Detailed view of the sides and bottom of the base part.

Finally, <FIG. 7> shows more detail behind the side and bottom views into the base part. "A" and "C" show the left and right side view of the base part, and "B" shows a cutaway of the left side view. In "A", the actual LED light bulb can be seen in 702, with the LED lens that covers each bulb shown in 701. 704 shows the optional mini-USE port and 703 shows the speaker horn that serves to amplify the sound from the speakers of the mobile phone device. "E" shows a cutaway of the same left side view as in "A", with a few additional details shown. 706 depicts the circuit board that is used to control the individual LED light bulbs, 704 shows the docking connector that attaches to the docking port of the mobile phone device, and 705 depicts one of the several locking tabs that secures the base part to the cover part of the protective case assembly. In "C", which is the right side view of the base part, additional details are shown. Once again the LED light, bulb 708 is shown with the covering LED lens 707. In this particular embodiment, 709 shows the opening for the camera integrated with the mobile phone device, 710 shows the portable power source (battery) in the base unit that provides power for the LED ring, with 711 showing the circuit board onto which the LED ring is mounted.

Also in <FIG. 7>, "D" and "E" provide further details looking down into the interior, bottom portion of the base part. In "D", the LED light bulb and lens can be seen in 715, the optional mini-USE port in 714, the docking connector in 721, speaker horn in 713, and the LED circuit board in 716. 712 shows a locking tab into which a corresponding tab from the cover part latches into when the protective case is assembled. Finally, in "E", a cutaway view of "D" is shown, providing additional details. 717 is the LED circuit board, 713 depicts the LED light bulbs which are place in a recessed opening, with 719 showing the LED lens covering each individual lens. 720 shows the circuit docking port circuit board in the same view.

What is claimed is:

1. An apparatus comprising:
    an Integrated Lighting Accessory and Case for a mobile phone device;
    provide the protecting of mobile phone device case with an integrated ring of Light Emitting Diode (LED) lights in the case and to provide an illumination to be used in conjunction with functionality native to the phone device;
    the base part embedded electronic circuitry in the case with a portable power source that provides the ability to illuminate the LEDs simultaneously or selectively;
    the ring of LED lights are mounted in a recessed manner in the case, with each LED light being covered by a lens to provide for diffusion of the illumination;
    the protective case house a separate docking port and/or extend the docking port native to the mobile phone device, thereby providing for a replacement identical docking port and optionally a mini and/or standard USB connection; wherein an additional port used to provide power and programmability to the LSD lights embedded in the case; further, the LED light ring illuminated to provide a diffused light source to be used in conjunction with professional photography and/or videography.

2. The apparatus according to claim 1, wherein provides a software application downloaded to the phone device that provides the user with an ability to control the illumination properties of each individual LED on the protective case.

* * * * *